US011399666B2

(12) United States Patent
Hill et al.

(10) Patent No.: US 11,399,666 B2
(45) Date of Patent: Aug. 2, 2022

(54) SYSTEM FOR STORING, TRANSPORTING, PREPARING, AND SERVING FOOD

(71) Applicant: Rembir, LLC, Garland, TX (US)

(72) Inventors: Ian Ashley Hill, Plano, TX (US); Christopher Blake Bassett, Garland, TX (US)

(73) Assignee: Rembir, LLC, Garland, TX (US)

( * ) Notice: Subject to any disclaimer, the term of this patent is extended or adjusted under 35 U.S.C. 154(b) by 0 days.

(21) Appl. No.: 17/461,032

(22) Filed: Aug. 30, 2021

(65) Prior Publication Data

US 2022/0061592 A1    Mar. 3, 2022

Related U.S. Application Data

(60) Provisional application No. 63/072,435, filed on Aug. 31, 2020.

(51) Int. Cl.
*A47J 47/00* (2006.01)
*A47J 47/14* (2006.01)
*B65D 25/10* (2006.01)

(52) U.S. Cl.
CPC ............ *A47J 47/14* (2013.01); *A47J 47/005* (2013.01); *B65D 25/106* (2013.01)

(58) Field of Classification Search
CPC ................................ A47J 47/14; A47J 47/005
See application file for complete search history.

(56) References Cited

U.S. PATENT DOCUMENTS

2014/0311361 A1 * 10/2014 Wangler ............... A47J 39/006
99/472

FOREIGN PATENT DOCUMENTS

DE       4339557 A1 *  5/1995  ......... B65D 81/3825

OTHER PUBLICATIONS

Machine Translation of DE-4339557-A1 (Year: 1995).*

* cited by examiner

*Primary Examiner* — Nirvana Deonauth
(74) *Attorney, Agent, or Firm* — Winstead PC

(57) ABSTRACT

A container system for storing, transporting, preparing, and serving food includes a first container half having a body. The first container half includes a first cavity defined by an interior space of the body of the first container half, a first recessed edge formed into a face of an opening of the first cavity, and a groove formed into the face of the opening of the first cavity. The container system also includes a second container half having a body. The second container half includes a second cavity defined by an interior space of the body of the second container half, a second recessed edge formed into a face of an opening of the second cavity, and a tongue extending from the face of the opening of the second cavity and configured to fit within the groove when the first container half is mated to the second container half.

18 Claims, 5 Drawing Sheets

SYSTEM FOR STORING, TRANSPORTING, PREPARING, AND SERVING FOOD

CROSS-REFERENCE TO RELATED APPLICATIONS

This patent application claims the benefit under 35 U.S.C. § 119(e) of U.S. Provisional Patent Application No. 63/072,435 filed on Aug. 31, 2020. U.S. Provisional Patent Application No. 63/072,435 is hereby incorporated by reference in its entirety.

TECHNICAL FIELD

The present disclosure relates generally to containers for food and more particularly, but not by way of limitation, to a system for storing, transporting, preparing, and serving food.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, a container system for storing, transporting, preparing, and serving food includes a first container half having a body. The first container half includes a first cavity defined by an interior space of the body of the first container half, a first recessed edge formed into a face of an opening of the first cavity, and a groove formed into the face of the opening of the first cavity. The container system also includes a second container half having a body. The second container half includes a second cavity defined by an interior space of the body of the second container half, a second recessed edge formed into a face of an opening of the second cavity, and a tongue extending from the face of the opening of the second cavity and configured to fit within the groove when the first container half is mated to the second container half.

In some aspects, a method of making a container system for storing, transporting, preparing, and serving food includes providing a first container half having a body. The first container half includes a first cavity defined by an interior space of the body of the first container half, a first recessed edge formed into a face of an opening of the first cavity, and a groove formed into the face of the opening of the first cavity. The method includes providing a second container half having a body. The second container half includes a second cavity defined by an interior space of the body of the second container half, a second recessed edge formed into a face of an opening of the second cavity, and a tongue extending from the face of the opening of the second cavity and configured to fit within the groove when the first container half is mated to the second container half.

DESCRIPTION OF THE FIGURES

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
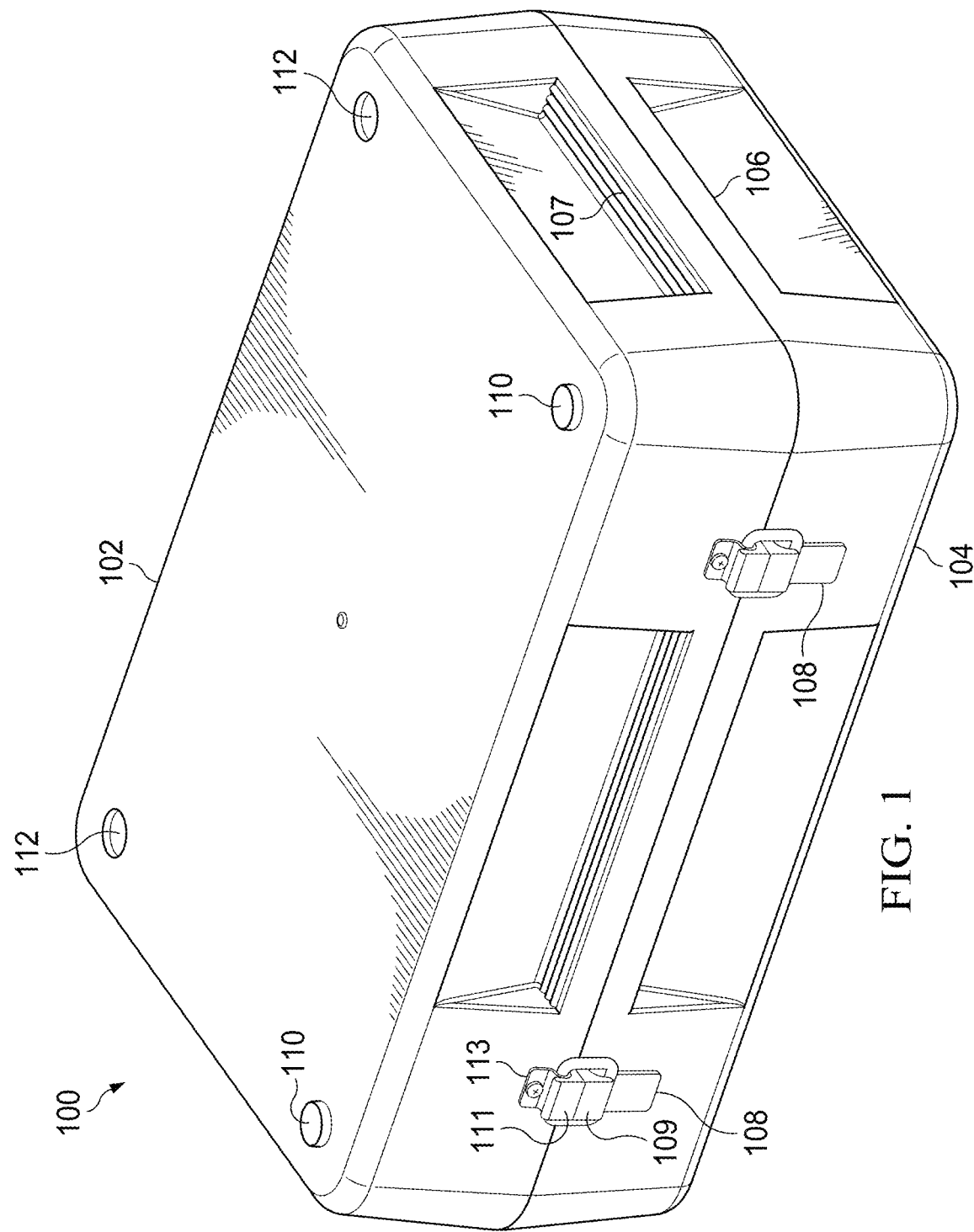
FIG. 1 is a perspective view of a container system for storing, transporting, preparing, and serving food according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms connect, connection, connected, in connection with, and connecting may be used to mean in direct connection with or in connection with via one or more elements. Similarly, the terms couple, coupling, coupled, coupled together, and coupled with may be used to mean directly coupled together or coupled together via one or more elements. Terms such as up, down, top and bottom and other like terms indicating relative positions to a given point or element are may be utilized to more clearly describe some elements. Commonly, these terms relate to a reference point such as the surface from which drilling operations are initiated.

Figure 2:
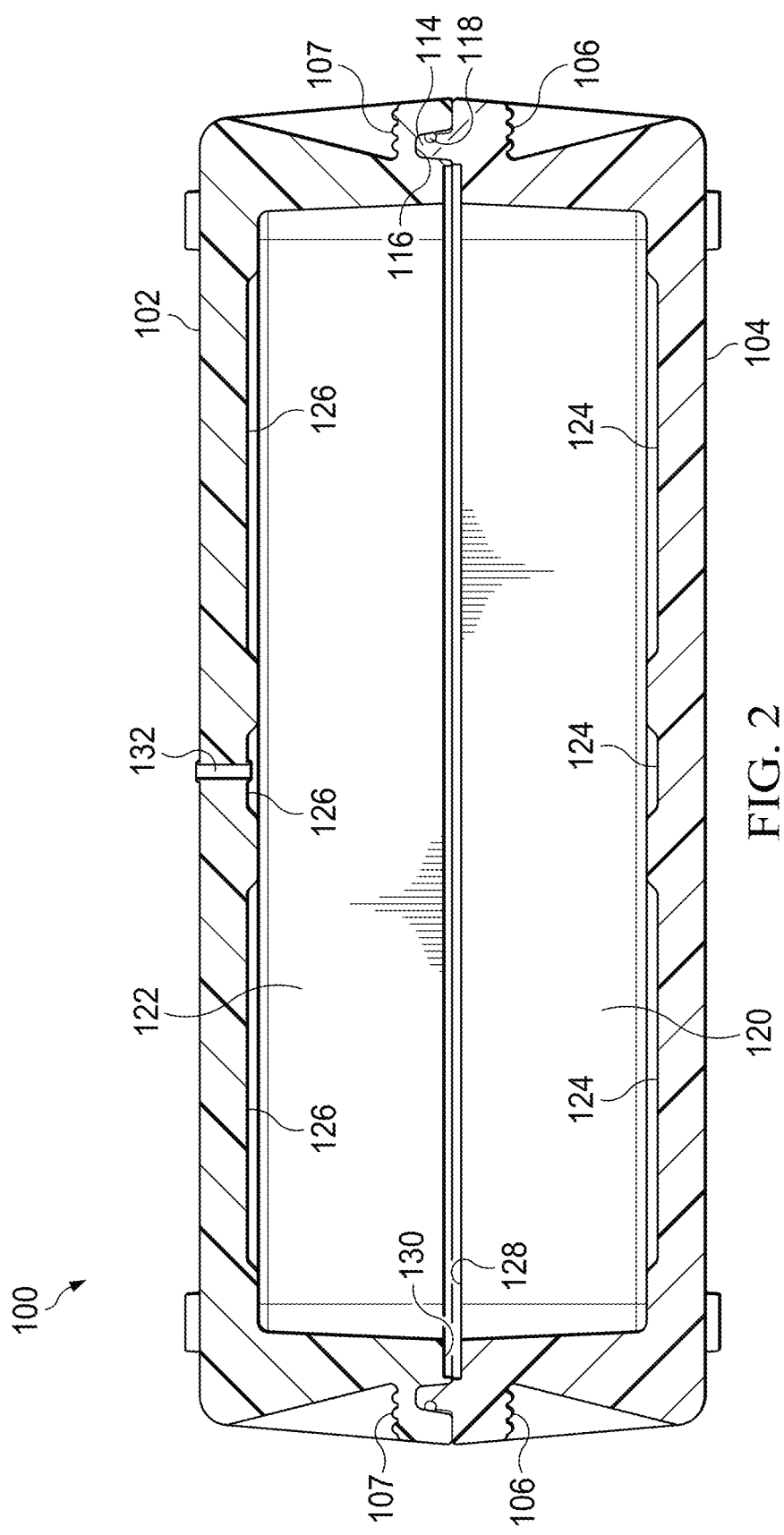
FIG. 2 is a sectioned side view of the container system of FIG. 1 according to aspects of the disclosure.

FIG. 1 is a perspective view of a container system 100 for storing, transporting, preparing, and serving food. FIG. 2 is a sectioned side view of container system 100. Referring to both FIGS. 1 and 2, container system 100 includes a first container half 102 and a second container half 104 that form a container having a space therein to store food, supplies, and/or other items useful for preparing and serving food (e.g., utensils). The space comprises a cavity 120 of second container half 104 and a cavity 122 of first container half 102. Cavity 120 is defined by the interior space between the walls of second container half 104. Cavity 122 is defined by the interior space between the walls of first container half 102. As illustrated in FIGS. 1 and 2, first and second container halves 102, 104 have similar depth dimensions. In other aspects, first and second container halves 102, 104 may have different dimensions with one being deeper than the other. In some aspects, first container half 102 may have a shallow depth to server more as a lid that covers second container half 102. In such aspects, first container half 102 may be transparent to allow a user to see what is in second container half 104.

As shown, first container half 102 includes latches that are used to secure the two halves together. Each latch includes a stretch ring 108, a first tab 109 that is a part of second container half 104, a second tab 111 that is a part of first container half 102, and a stretch-ring holder 113. Stretch ring 108 is made of an elastic material so that it may be stretched and pulled down and over first tab 109. Stretch-ring holder 113 is a bracket that is attached to first container half 102 so that stretch ring 108 is retained on second tab 111. The latch may be opened by pulling stretch ring 108 down, to free stretch ring 108 from first tab 109, and lifted over first tab 109. Though not visible in FIG. 1, container system 100 includes two additional latches on an opposite side of container system 100, for a total of four latches. In other aspects, the latches can take other forms such as clasps, mechanical latches, and the like. In other aspects, a pair of the four latches could be replaced with hinges that allow second container half 104 to open like a book relative to first container half 102.

In some aspects, second container half 104 includes a gasket (see gasket 118 in FIG. 2) that helps seal the space within container system 100 from the exterior of the container when first container half 102 is seated on second container half 104. Sealing contain system 100 helps maintain temperature within container system 100 (e.g., hot items stay hot and cold items stay cold) and prevents liquids/solids inside of container system 100 from leaking out. First container half 102 and second container half 104 include grips 107, 106, respectively, that make it easier for a user to pick up container system 100 and/or first and second container halves 102, 104 individually.

As shown in FIG. 1, first container half 102 includes feet 110 that extend from a top of first container half 102 and indentations 112 that are recessed into the top of first container half 102. Feet 110 and indentations 112 are dimensioned to mate with indentations/feet respectively of additional container systems 100 to permit multiple container systems 100 to stack on top of one another precisely and without sliding relative to one another. Second container half 104 similarly includes feet 110 and indentations 112. In some aspects, first container half 102 or second container half 104 has indentations 112 (e.g., four indentations 112 and no feet 110) and the other of second container half 104 and first container half 102 has feet 110 (e.g., four feet 110 and no indentations 112).

Each of first and second container halves 102, 104 acts an insulator so that the temperature within the container can be controlled (e.g., the temperature inside the container system can be relatively maintained while the container is closed to keep hot foods hot or cold foods cold). In some aspects, first and second container halves 102, 104 are sealed hollows (e.g., the cross-hatched portions in FIG. 2 represent an empty space within first and second container halves 102, 104 and may be at a pressure below atmospheric pressure or at atmospheric pressure). In some aspects the hollows of first and second container halves 102, 104 can include insulative materials or fillers such as foams, gels, and the like. In some aspects, first and second container halves 102, 104 are solid and may be made of insulative materials such as plastic, foams, Styrofoam, and the like.

As shown in FIG. 2, container system 100 is closed with first and second container halves 102, 104 mated together to seal the inside of container system 100. The seal between first and second container halves 102, 104 is created via a tongue 114 of second container half 104 that extends into a groove 116 of first container half 102. A gasket 118 is seated in a groove formed into a wall of tongue 114 and presses into a wall of groove 116 to provide a seal therebetween. The groove helps retain gasket 118 in place. Gasket 118 may be made from various materials such as rubbers, foams, plastics, etc. The elasticity of gasket 118 helps to retain gasket 118 in the groove, while still allowing gasket 118 to be removed from second container half 104 to allow for container system 100 to be sanitized.

Second container half 104 includes several recesses 124 formed into an interior surface of second container half 104. Recesses 124 act as collection troughs for moisture (e.g., condensation, drippings from food, etc.) and also improve the rigidity of first container half 102. First container half 102 includes recesses 126, which are similar to recesses 124. When first container half 102 is removed from second container half 104 and inverted for use, recesses 126 similarly act as collection troughs for moisture etc. First container half 102 also includes a vent 132 formed through the body of first container half 102. Vent 132 may be blocked off with a stopper or plug to seal the space within the container. With the stopper or plug removed, vent 132 permits fluid to leave the interior of container system 100 (e.g., steam may be allowed to escape). Vent 132 may also be used as a drain to permit fluid to drain out first container half 102 when first container half 102 is inverted. Though not shown in FIG. 2, second container half 104 may also include a vent in some aspects.

Second container half 104 includes a recessed edge 128 that extends around a periphery of the opening of second container half 104. Recessed edge 128 is recessed from a recessed edge 130 of first container half 102 so that a space exists between recessed edges 128, 130 when first and second container halves 102, 104 are mated together. Recessed edges 128, 130 are dimensioned to receive accessories such as, for example, a cutting board, a food tray (e.g., a standard tin foil or metal food tray, and the like). A depth of the space formed between recessed edges 128, 130 may be, for example, between about ¼ of an inch to about ½ of an inch. Recessed edge 130 similarly accommodates cutting boards, food trays, and the like when first container half 102 is removed from second container half 104 and set with the opening of first container half 102 facing upward.

Figure 3:
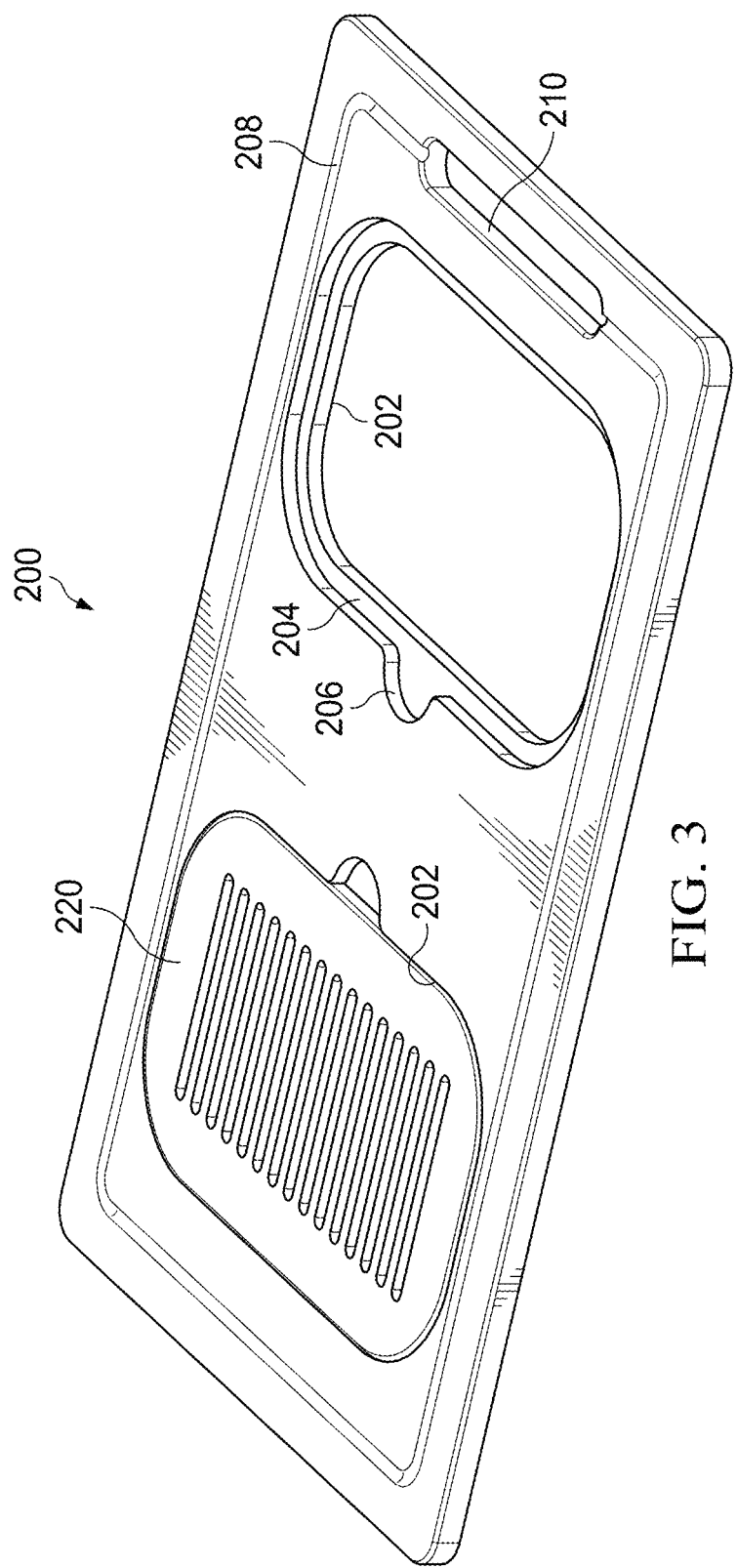
FIG. 3 is a perspective view of a cutting board for a container system according to aspects of the disclosure.

FIG. 3 is a perspective view of a cutting board 200 for use with container system 100. Cutting board 200 is dimensioned to sit within an opening of second container half 104 and/or first container half 102 and provides a work surface that can be used to process/trim/cut food. In various aspects, cutting board 200 is dimensioned to sit within recessed edges 128, 130, with a top surface of cutting board 200 sitting at or below the top face of second container half 104/first container half 102, respectively, to allow first and second container halves 102, 104 to mate flush and seal with cutting board 200 in place. Cutting board 200 includes a pair of openings 202 that can be closed off with a removable lid 220. Covering one or both openings 202 with removable lids 220 provides a work surface for the processing of food. Once the food has been processed (e.g., cut/shredded/etc.), removable lid 220 can be lifted from opening 202 and the processed food can be pushed into a space beneath the cutting board (e.g., cavity 120 for second container half 104, cavity 122 for first container half 102) without removing cutting board 200 from the first and second container halves 102, 104.

Each opening 202 of cutting board 200 includes a recessed edge 204 upon which removable lid 220 rests when inserted into opening 202. Cutouts 206 make it easier for a user to lift removable lid 220 from the cutting board to access the space beneath cutting board 200. Cutting board 200 includes a channel 208 that extends around a periphery of cutting board 200. Channel 208 collects fluids resulting from processing food on cutting board 200. Cutting board 200 includes a handle 210 that makes it easier for a user to place and/or remove cutting board 200 onto the first and second container halves 102, 104. As shown in FIG. 3, channel 208 connects with the opening formed by handle 210 so that fluid that has collected in channel 208 can drain into the space below cutting board 200.

Figure 4:
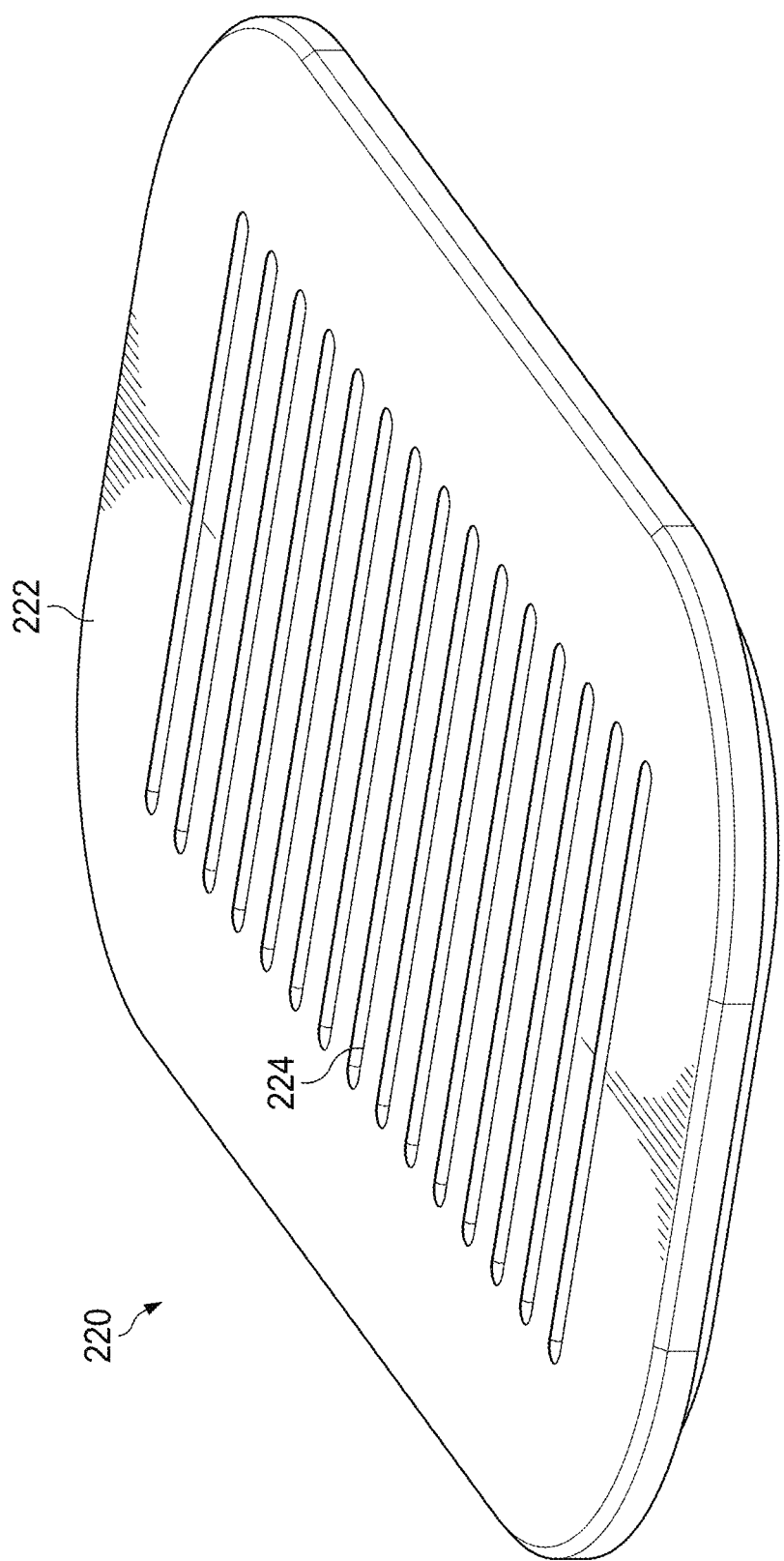
FIG. 4 is a perspective view of a removable lid for the cutting board of FIG. 3 according to aspects of the disclosure.

FIG. 4 is a perspective view of removable lid 220. Removable lid 220 includes a work surface 222 with a series of slots 224 formed therein that allow juices/solids from food being cut/processed to drain therethrough to the food tray or cavity below. The removable lid includes a lip that is dimensioned to match up with recessed edge 204 of cutting board 200.

Figure 5:
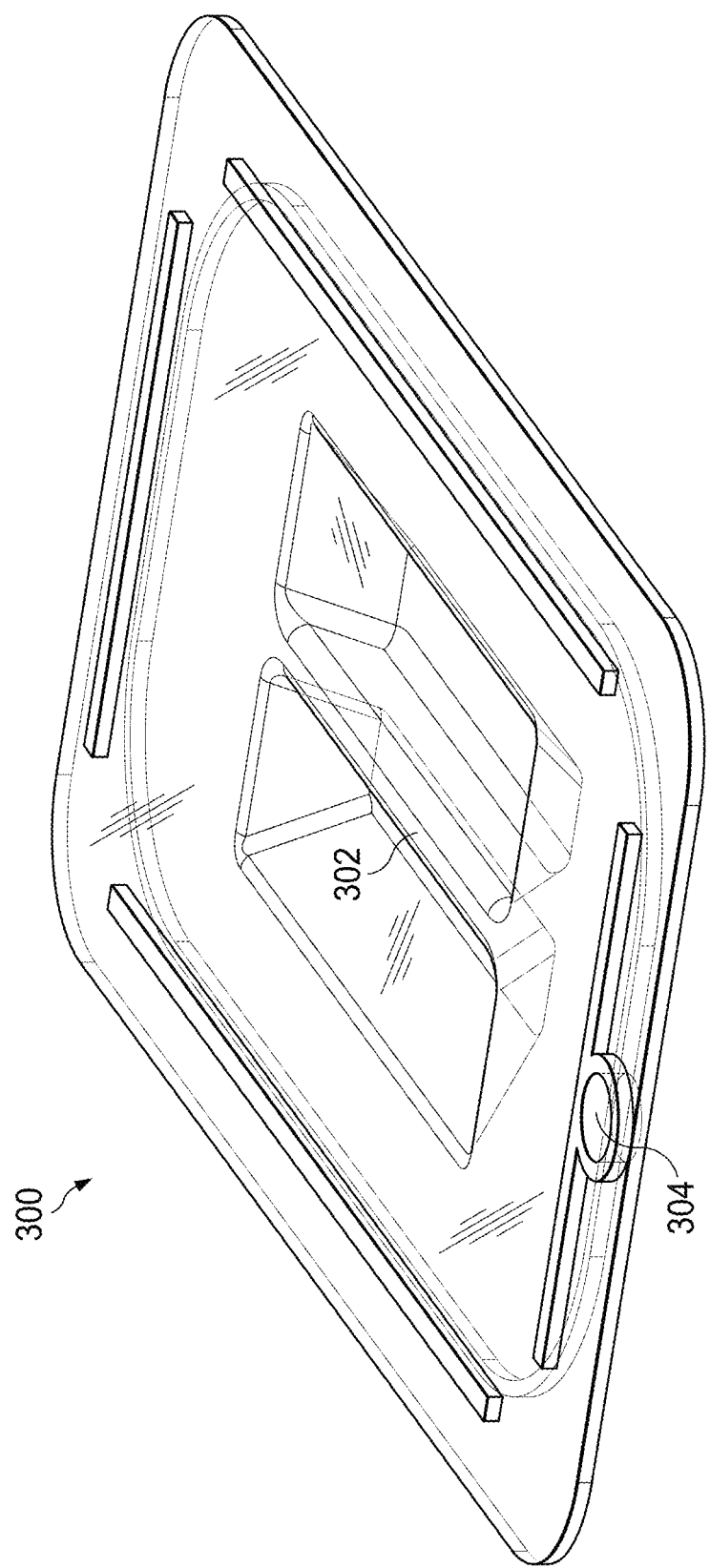
FIG. 5 is a perspective view of a serving lid for a container system according to aspects of the disclosure.

FIG. 5 is a perspective view of a serving lid 300. Serving lid 300 can be used in place of cutting board 200 when it is time to serve food. In some aspects, food may be placed directly into cavities 120, 122 for storage and/or serving. In some aspects, serving lid 300 is dimensioned so that two serving lids 300 may be placed side by side above cavity 120. In some aspects, a removable food tray may be placed in cavities 120, 122 (e.g., a standard tin foil or metal tray commonly used for food storage). Serving lid 300 includes a pinch handle 302 and/or finger hole 304 to assist with removal of serving lid 300. In some aspects, serving lid 300 may be transparent so that a user can see what/how much food is stored below.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A container system for storing, transporting, preparing, and serving food, the container system comprising:
   a first container half having a body and comprising:
      a first cavity defined by an interior space of the body of the first container half;
      a first recessed edge formed into a face of an opening of the first cavity; and
      a groove formed into the face of the opening of the first cavity; and
   a second container half having a body and comprising:
      a second cavity defined by an interior space of the body of the second container half;
      a second recessed edge formed into a face of an opening of the second cavity; and
      a tongue extending from the face of the opening of the second cavity and configured to fit within the groove when the first container half is mated to the second container half; and
   a cutting board configured to sit within the first recessed edge and comprising an opening formed through the cutting board, the opening formed through the cutting board aligned with the first cavity when the cutting board sits in the first recessed edge.

2. The container system of claim 1, further comprising a removable lid configured to sit within the opening formed through the cutting board.

3. The container system of claim 2, wherein the removable lid comprises a slot that permits solids and liquids to pass therethrough into the first cavity.

4. The container system of claim 1, wherein the cutting board comprises a channel that extends around a periphery of the cutting board.

5. The container system of claim 4, wherein the cutting board comprises:
   a handle formed through the cutting board; and
   the channel connects to the handle to allow solids and liquids to pass therethrough into the first cavity.

6. The container system of claim 1, further comprising a serving lid configured to sit within the first recessed edge.

7. The container system of claim 1, further comprising a latch that secures the first container half to the second container half.

8. The container system of claim 7, wherein the latch comprises a stretch ring that secures the first container half to the second container half.

9. The container system of claim 1, further comprising a gasket secured to the tongue of the first container half to create a seal between the first and second container halves when the first and second container halves are mated together.

10. The container system of claim 1, wherein the first container half comprises a foot configured to fit within an indentation of a second container system.

11. The container system of claim 1, wherein the second container half comprises a foot configured to fit within an indentation of a second container system.

12. The container system of claim 1, wherein the first container half comprises a vent that fluidly couples the first cavity with an area surrounding the container system.

13. The container system of claim 1, wherein the first container half comprises a recess formed into a wall of the first cavity.

14. A method of making a container system for storing, transporting, preparing, and serving food, the method comprising:
   providing a first container half having a body and comprising:
      a first cavity defined by an interior space of the body of the first container half;
      a first recessed edge formed into a face of an opening of the first cavity; and
      a groove formed into the face of the opening of the first cavity; and
   providing a second container half having a body and comprising:
      a second cavity defined by an interior space of the body of the second container half;
      a second recessed edge formed into a face of an opening of the second cavity; and a tongue extending from the face of the opening of the second cavity and configured to fit within the groove when the first container half is mated to the second container half; and providing a cutting board configured to sit within the first recessed edge and comprising an opening formed through the cutting board, the opening formed through the cutting board aligned with the first cavity when the cutting board sits in the first recessed edge.

15. The method of claim 14, further comprising providing a removable lid configured to sit within the opening formed through the cutting board.

16. The method of claim 15, wherein the removable lid comprises a slot that permits solids and liquids to pass therethrough into the first cavity.

17. The method of claim 14, wherein the cutting board comprises a channel that extends around a periphery of the cutting board.

18. The method of claim 17, wherein the cutting board comprises:
   a handle formed through the cutting board; and
   the channel connects to the handle to allow solids and liquids to pass therethrough into the first cavity.

\* \* \* \* \*